Figure 1:
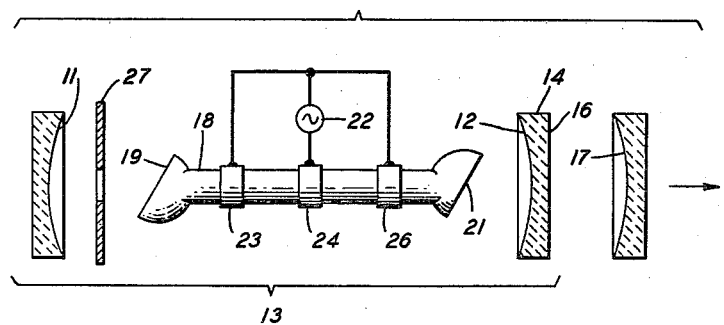

June 1, 1965  H. W. KOGELNIK ETAL  3,187,270
OPTICAL MASER MODE SELECTOR
Filed Aug. 27, 1962

INVENTORS: H. W. KOGELNIK
C. K. N. PATEL
BY
ATTORNEY

United States Patent Office 3,187,270
Patented June 1, 1965

3,187,270
OPTICAL MASER MODE SELECTOR
Herwig W. Kogelnik and Chandra K. N. Patel, Summit, N.J., assignors to Bell Telephone Laboratories, Incorporated, New York, N.Y., a corporation of New York
Filed Aug. 27, 1962, Ser. No. 219,693
3 Claims. (Cl. 331—94.5)

This invention relates to optical masers and, more particularly, to cavity resonators for use in such devices.

The recent invention of the optical maser has made possible the generation and amplification of coherent electromagnetic waves in the optical frequency range, which is generally considered to extend from the farthest infrared portion of the spectrum through the ultraviolet. Due to the extremely high frequencies associated with wave energy in this range, the coherent waves produced by optical maser devices are capable of transmitting enormous quantities of information. Thus, the resulting extension of the usable portion of the electromagnetic spectrum has greatly increased the number of frequency channels available for communication and other uses. Since the angular spread of a coherent monochromatic beam is ultimately limited only by diffraction due to the finite size of the maser aperture, it is also possible to provide a highly directional beam for secure and efficient communication over long distances.

As developed for use at microwave frequencies, masers typically comprise a negative temperature medium contained in a cavity resonator having a single resonant mode near the frequency at which stimulated emission is to be produced. The design of cavity resonators for microwaves is a relatively simple matter, typical structures having dimensions on the order of a single wavelength at the chosen frequency. The application of the same design approach to optical masers is impractical, however, due to the extremely small wavelengths involved. It has been necessary, therefore, to design optical cavity resonators having dimensions which may be thousands of times larger than the wavelength of signals at the operating frequency.

One such structure which has been employed successfully for the specified purpose is the confocal resonator comprising two axially spaced concave spherical reflective surfaces arranged with their focal points coincident. The active medium of the maser is located in the gap between the reflective surfaces, at least one of which may be partially transmissive to permit coupling the device to an external utilization circuit. Optical masers of this type are described in copending patent application, Serial No. 61,205, filed October 7, 1960, by Boyd, Fox and Li issued on September 25, 1962, as United States Patent No. 3,055,257.

Optical cavity resonators, being of necessity much larger than the wavelengths employed therewith, are inherently multimode devices. A mathematical analysis of the mode system in the confocal resonator may be found in an article by Boyd and Gordon in the Bell System Technical Journal, Vol. 40, page 489. Boyd and Gordon have shown that the resonator may be characterized by a number of axial and off-axial modes having very low losses. The theory of the confocal resonator has been generalized by Boyd and Kogelnik (Bell System Technical Journal, Vol. 41, page 1347) to include cases where the spherical reflectors are of unequal curvature and their focal points are not coincident. Stable modes have been found to exist for a variety of reflector spacings and these are now commonly used as being interchangeable in all respects with the strictly confocal case. In devices having the configuration analyzed in the above-mentioned articles, which are hereby incorporated by reference into this specification, losses are substantially the same in all axial modes. Thus, no axial mode is preferred and several may be excited simultaneously. In an optical maser employing a resonator of this type, oscillation may be produced at frequencies corresponding to a number of modes which fall within that portion of the emission line width of the active medium which exceeds a threshold value.

The presence of many modes in a maser adapted for communication purposes, however, is disadvantageous. For example, an increase in the power level of a multimode device will cause additional modes to oscillate, instead of producing a single well-defined output line which stands out clearly from the background emission. In some applications a substantially monochromatic output beam is desired rather than the plurality of closely spaced frequencies produced by most prior devices. Furthermore, the excitation of many modes has an adverse effect on the frequency stability of the maser, an important consideration in communications systems.

It is an object of this invention to provide an optical maser cavity resonator having a mode system which includes a relatively few preferred modes among a plurality of resonant modes.

It is also an object of this invention to increase the losses of certain longitudinal modes in the cavity resonator of an optical maser, relative to other preferred modes therein.

These and other objects of the invention are achieved in an illustrative embodiment thereof comprising two axially spaced concave spherical reflective surfaces defining the ends of an optical cavity resonator, and a third spherical reflective surface intermediate the curved end reflectors and spaced therefrom. The third reflective surface divides the overall cavity into two smaller gaps, at least one of which contains the negative temperature medium. Thus, in the illustrative embodiment three axially spaced spherical reflective surfaces define two gaps, one of which contains the active medium and is conveniently designated the "primary cavity."

It is a feature of the invention that the reflective surface interior to the overall cavity defined by the two end reflective surfaces is partially transmissive to light wave energy at the operating frequency of the maser. In addition, one of the two end reflective surfaces defining the overall cavity may be partially transmissive to permit output energy to be abstracted. It may be desirable in some instances that both end reflective surfaces be partially transmissive and such is also in accordance with the invention.

A further feature of the invention is that the concave spherical reflectors defining the overall cavity have coincident focal points. The overall cavity is thus strictly confocal.

Another feature of the invention is that the primary cavity of the optical maser is characterized by a stable mode system in accordance with the criteria set forth in the above cited publication of Boyd and Kogelnik.

Figure 2:
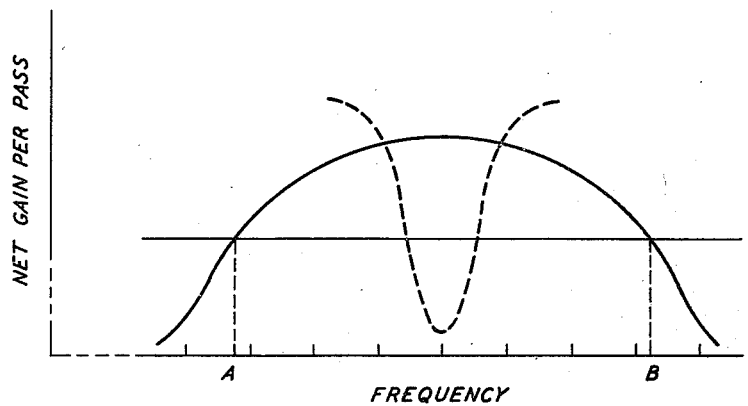

The above-mentioned as well as other objects and features of the invention will be better understood from the following more detailed discussion taken in conjunction with the accompanying drawing, in which:

FIG. 1 depicts an illustrative optical maser embodying the principles of the invention; and FIG. 2 aids in the explanation of the invention.

Referring now to the drawing there is shown in FIG. 1 a gaseous optical maser employing a mode selective optical cavity resonator in accordance with the principles of the invention. A pair of axially spaced concave spherical reflectors 11 and 12 define the ends of a primary cavity 13. The surface 12, which is partially transmissive to light wave energy at the operating frequency of the device, may be supported on a transparent member 14 the opposite surface 16 of which is advantageously provided with an antireflection coating of a type known in the art. Positioned adjacent the cavity 13 and axially spaced from the reflector 12 is an auxiliary concave spherical reflective surface 17, which may also be partially transmissive to permit light wave energy to be abstracted from the device.

A negative temperature medium, which in the optical maser shown in FIG. 1 is a gas or a mixture of gases, is disposed within the primary cavity 13. The active medium is contained in an elongated tube 18 having end surface 19 and 21 oriented substantially at Brewster's angle to the light beam path therethrough. The gaseous medium may comprise, for example, a mixture of helium and neon and is excited by means of a radio frequency source 22 coupled to conductive rings 23, 24 and 26 which encircle the tube 18. Gaseous optical masers of this type are now well known in the art and need not be further described herein. It is to be understood, however, that the invention may be practiced with solid state active media as well as with gaseous media of differing compositions. Although in the illustrated embodiment the gaseous medium is contained in a tube 18 positioned within the primary cavity 13, it is feasible—but generally less convenient—to include the reflectors 11 and 12 within the tube. Also located within the primary cavity 13 is an iris or diaphragm which serves to limit the effective aperture of the reflector 11 for purposes discussed below.

As has been mentioned, stable mode patterns have been found to exist in open resonators formed by two concave spherical reflectors or their equivalent—such as a single concave spherical reflector spaced from a planar reflector. A rather thorough analysis of the stability or instability of the modes for varying spacings, curvatures and aperture sizes is given by Boyd and Kogelnik in the publication referred to above and need not, therefore, be repeated here. They have shown that as a mechanical matter, it is generally easier to achieve a stable system by avoiding the strictly confocal arrangement of reflectors. This approach has gained wide acceptance.

In accordance with the principles of this invention the primary cavity 13 formed by reflectors 11 and 12 is required to satisfy the stability criteria for optical resonators, while the auxiliary reflector 17 is required to have a radius of curvature equal to that of the reflector 11 and to be confocal therewith. Normally a stable optical resonator of the type under consideration is characterized by a plurality of off-axial or transverse as well as longitudinal or axial modes. The diaphragm 27 advantageously may be employed to prevent oscillation in all but the fundamental axial modes. The frequencies at which the axial resonances occur are regularly spaced and are determined primarily by the dimensions of the cavity. For example, when the reflectors are placed one meter apart, the separation of the modes is about 150 megacycles.

In FIG. 2, the mode frequencies are indicated by the short vertical lines. The width of the maser transition in a conventional optical resonator is shown by the solid curve which is a plot of gain per pass of the light beam through the active medium, versus frequency. The threshold at which gain exceeds the losses due to scattering, reflection, et cetera is denoted by the horizontal line. It can be seen that all modes having frequencies between A and B will oscillate unless measures are taken to suppress them. However, for many scientific and technological applications, a single frequency output is desired. Perhaps the simplest way to select a single mode is to reduce the optical gain across the maser emission line or, equivalently, raise the threshold for oscillation until only a narrow portion of the line exceeds it. It is also possible to reduce the length of the cavity, thereby increasing the frequency separation between the modes. Unfortunately, all such measures have the undesirable effect of reducing the output power.

Following the principles of the invention, however, the auxiliary reflector 17 is placed adjacent the primary cavity 13 to increase the losses of modes removed from the center of the maser emission line. It can be shown that, provided the auxiliary reflector 17 is confocal with the reflector 11 and has an equal radius of curvature, all three reflectors will fit surfaces of constant phase of a fundamental longitudinal mode of the confocal cavity. The resulting distribution of the electromagnetic field between the confocal reflectors corresponds to that of the longitudinally asymmetric confocal modes described by Boyd and Kogelnik. In effect, both cavities formed by the three reflectors are stable and are theoretically interchangeable. Furthermore, this relation can be shown valid for any curvature, including the planar, of the reflector 12 provided that the primary cavity 13 is stable.

If the auxiliary reflector 17 is not confocal with the reflector 11 these conditions do not obtain and surfaces of constant phase can be matched only by providing a reflector of different curvature for each possible position of the reflector 12. The position of the reflectors in such a system is adjustable only over an extremely narrow range.

The effect of the reflector 17 on the net gain per pass of the light beam through the active medium is indicated by the dashed curve in FIG. 2 which represents the losses introduced into the system. Losses at mode frequencies removed from a selected frequency are increased, thereby reducing the net gain below the threshold at which oscillation may be sustained. If the mode frequencies are closely spaced compared to the natural linewidth a larger share of the stored energy represented by the population inversion among the energy levels of the active medium is available to produce gain in the selected modes. Moreover, the combined reflectivity of reflectors 12 and 17 at the center frequency is greater than that of either one alone. The result is more intense emission at fewer frequencies within the emission line width.

In a specific example, mode selection employing the invention was achieved in a helium-neon maser. The Doppler broadened linewidth of the $2s_2-2p_4$ transition of neon (11,532 A in the infrared) is about 800 megacycles. As indicated above, modes in a one meter cavity are only about 150 megacycles apart, so that oscillation typically occurs at several frequencies. The linewidth of the $3s_2-2p_4$ transition (6,325 A in the visible) is of the same order of magnitude as that of the $2s_2-2p_4$ transition. Since the gain per meter in the He-Ne maser is about 10%, the reflectors 11 and 12 had rather high reflectivities—about 99% in each case. An antireflection coating was applied to the surface 16. The auxiliary reflector 17 was placed 20 centimeters from the reflector 12 and its position was controlled within a fraction of a wavelength. The addition of the auxiliary reflector 17 was found to reduce by an order of magnitude the amplitude of beat frequencies between the various oscillating modes, while the maser output increased by about 50%. Oscillation in substantially a single optical mode was indicated.

Although the invention has been described with particular reference to specific embodiments, many variations and modifications are possible and may be made by those skilled in the art without departing from its scope and spirit.

What is claimed is:
1. An optical maser comprising
   a pair of axially spaced reflectors defining first and second ends of a stable nonconfocal primary optical cavity resonator,
   said first end reflector having a concave spherical shape and said second end reflector being partially trans- missive of light wave energy at the operating frequency, an auxiliary reflector adjacent said primary cavity and axially spaced from said second end reflector, said auxiliary reflector and said first end reflector forming an effective confocal cavity resonator with reflectors of equal radii of curvature, a negative temperature medium disposed within said primary cavity, means for pumping said negative temperature medium, and means for abstracting output energy from said primary cavity.

2. An optical maser as claimed in claim 1 wherein said second end reflector has a concave spherical shape.

3. An optical maser as claimed in claim 1 wherein said auxiliary reflector has a reflectivity substantially less than that of said second end reflector.

References Cited by the Examiner
UNITED STATES PATENTS 3,055,257  9/62  Boyd et al. _____ 88—1
3,134,837  5/64  Kisliuk et al. _____ 331—94.5

OTHER REFERENCES

Morgan, "Introduction to Geometrical and Physical Optics," McGraw-Hill, N.Y., 1953, page 232.

Boyd et al, "Confocal Multimode Resonator For Millimeter Through Optical Wavelength Masers," Bell System Technical Journal, vol. 40, No. 2, March 1961, pages 489–91.

Rigrod et al, "Gaseous Optical Maser With External Concave Mirrors," Journal of Applied Physics, volume 33, No. 2, February 1962, pages 743 and 744.

JEWELL H. PEDERSEN, *Primary Examiner*.